(12) United States Patent
Allarey (10) Patent No.: US 7,900,069 B2
(45) Date of Patent: Mar. 1, 2011

(54) DYNAMIC POWER REDUCTION

(75) Inventor: Jose P. Allarey, Davis, CA (US)

(73) Assignee: Intel Corporation, Santa Clara, CA (US)

( * ) Notice: Subject to any disclaimer, the term of this patent is extended or adjusted under 35 U.S.C. 154(b) by 893 days.

(21) Appl. No.: 11/731,837

(22) Filed: Mar. 29, 2007

(65) Prior Publication Data

US 2008/0244294 A1    Oct. 2, 2008

(51) Int. Cl.
G06F 1/32    (2006.01)
G06F 1/00    (2006.01)
G05F 1/10    (2006.01)

(52) U.S. Cl. .................. 713/320; 713/300; 713/324; 323/234

(58) Field of Classification Search ............ 713/300, 713/320, 324; 323/234
See application file for complete search history.

(56) References Cited

U.S. PATENT DOCUMENTS

| | | | |
|---|---|---|---|
| 5,953,237 A * | 9/1999 | Indermaur et al. ......... 700/295 |
| 6,901,522 B2 | 5/2005 | Buch | |
| 6,901,524 B2 | 5/2005 | Watts, Jr. | |
| 2003/0126477 A1* | 7/2003 | Zhang et al. ................. 713/300 |
| 2005/0044429 A1* | 2/2005 | Gaskins et al. .............. 713/300 |
| 2005/0046400 A1* | 3/2005 | Rotem ........................ 323/234 |
| 2005/0154931 A1* | 7/2005 | Oh ............................. 713/300 |
| 2005/0286193 A1* | 12/2005 | Alokby ...................... 361/93.1 |
| 2006/0099734 A1* | 5/2006 | Narendra et al. ............ 438/107 |
| 2006/0149975 A1* | 7/2006 | Rotem et al. ................ 713/300 |
| 2006/0242438 A1* | 10/2006 | Baba et al. .................. 713/300 |
| 2008/0052542 A1* | 2/2008 | Capps et al. ................ 713/300 |
| 2008/0168287 A1* | 7/2008 | Berry et al. ................. 713/323 |

FOREIGN PATENT DOCUMENTS

| | | |
|---|---|---|
| KR | 1020050065007 | 6/2005 |
| KR | 1020050076747 | 7/2005 |
| WO | 2008/121625 | 10/2008 |

* cited by examiner

Primary Examiner—Vincent T Tran
(74) Attorney, Agent, or Firm—Kacvinsky Daisak PLLC

(57) ABSTRACT

Some embodiments of the invention include systems, apparatuses, and methods for dynamically reducing requested supply voltage based on idle functional blocks.

27 Claims, 5 Drawing Sheets

DYNAMIC POWER REDUCTION

BACKGROUND

1. Technical Field

Some embodiments of the present invention generally relate to power management techniques. In particular, some embodiments relate to power management through dynamic supply voltage reduction.

2. Discussion

As the trend toward advanced processors with more transistors and higher frequencies continues to grow, computer designers and manufacturers are often faced with corresponding increases in power consumption. Without power management, integrated circuits (ICs) such as processors with multiple cores can consume excessive power. Accordingly, new power management approaches are desired.

BRIEF DESCRIPTION OF THE DRAWINGS

Various advantages of embodiments of the present invention will become apparent to one skilled in the art by reading the following specification and appended claims, and by referencing the following drawings, in which:

DETAILED DESCRIPTION

In accordance with some embodiments, the requested supply voltage from a voltage regulator module (VRM) to an integrated circuit device (such as a processor) can dynamically be reduce when inactivity in the IC is identified because less voltage will be dropped across the VRM power delivery network (load-line). That is, the same or higher supply voltage can be provided to the chip by a smaller voltage from the VRM when there is less supply current required from the VRM because it results in a smaller drop across its load-line. This is beneficial, for example, because lower voltages typically result in lower power and improved reliability. In an exemplary application, a processor with multiple cores may request a reduced supply voltage from its VRM when it recognizes that one or more of its cores are idle because less current will be drawn from the VRM.

Figure 1:
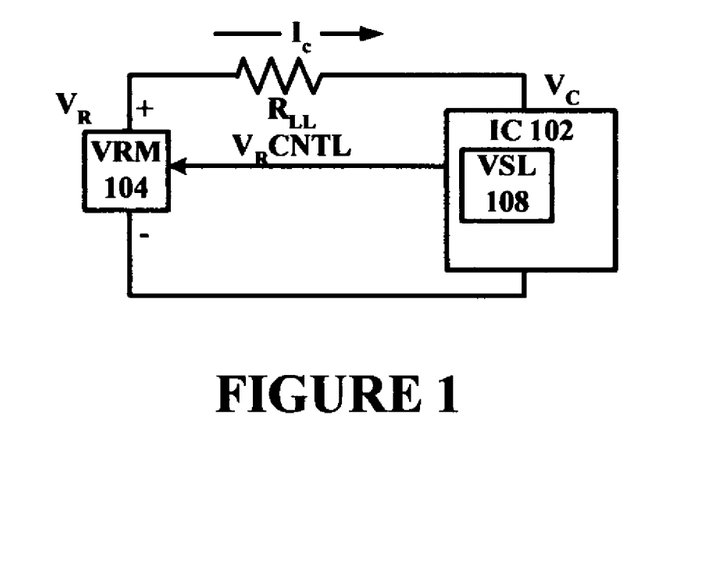
FIG. 1 is a block diagram of an integrated circuit with voltage selection logic (VSL) according to some embodiments of the invention.

FIG. 1 generally shows a IC device 102 coupled to a VRM 104 to receive from it a supply voltage $V_C$ in response to a requested regulator voltage $V_R$. The value of the regulator voltage $V_R$ is determined by voltage selection logic (VSL) 108 and communicated to the VRM 104 through a control signal ($V_R$CNTL). The IC 102 could be any IC device implementing, for example, a system-on-a-chip (SOC), processor, ASIC, network component, controller, or the like. It has one or more functional blocks such as cores or the like that may be active or idle (e.g., having an active clock when active or turned off or substantially slowed down clock when idle). The VSL 108 has the ability to determine an amount of reduced load-line drop and/or supply current reduction (which translates to load-line drop) based on how many and/or which functional blocks are idle. (Note that as used herein, the term "determine" or "determining" refers to obtaining a result through measurement, estimation, calculation, derivation, identification, and the like and is intended to be used in its broadest sense.)

With many applications, depending on desired operating performance, specifications may require that the supply voltage $V_C$ be at or above a minimum level. However, the supply voltage ($V_C$) actually received by the IC is smaller than the regulator voltage ($V_R$) due to the voltage drop over the power delivery network, modeled as the load-line resistance $R_{LL}$. The load-line voltage drop will be: $R_{LL} \times I_C$. Therefore, $V_C$ is: $V_R - (I_C \times R_{LL})$. Accordingly, this should be considered in order to obtain an acceptable supply voltage $V_C$ at the IC.

To meet the $V_C$ requirement, traditional approaches, for example, select a regulator voltage ($V_R$) value such that $V_C$ will not go below the specified value, even when all functional blocks are active. That is, a worse-case supply current ($I_C$) is assumed (all blocks being active), and a $V_R$ is requested to provide a $V_C$ that meets this condition. With other known approaches, a VSL might decrement the requested $V_R$ by a fixed, "safe" amount in response to functional blocks being idle, regardless of its present performance state. However, this still fails to consider how much the supply can actually be reduced in view of the particular reduction in the drop across the load-line for particular operating conditions. Accordingly, with some embodiments disclosed herein, the reduction in load-line drop is determined (calculated, estimated, measured, derived and/or identified) based on the quantity and/or quality of idle blocks, to more optimally reduce the requested $V_R$ and at the same time, meet supply voltage requirements.

Figure 2:
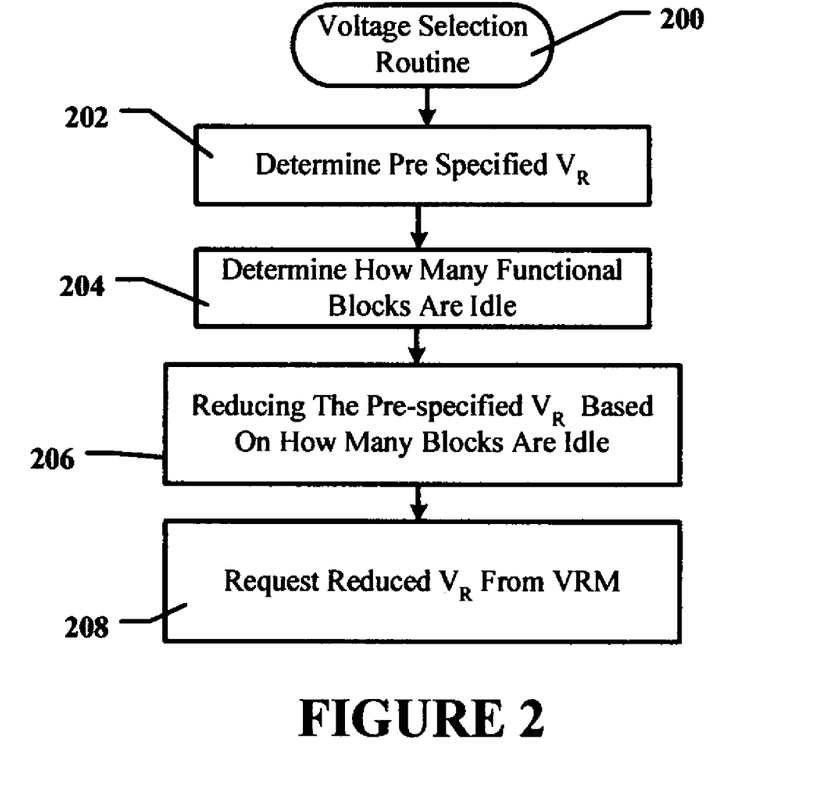
FIG. 2 is a flow diagram of a voltage selection routine that may be performed by the VSL according to some embodiments of the invention.

FIG. 2 generally shows a routine 200 that may be performed by VSL 108 to dynamically select reduced regulator voltages $V_R$. At 202, it determines a received supply voltage specification. At 204, it determines one or more idle IC blocks. At 206, it determines a requested supply voltage value based on the specified received value and on a reduction in the load-line drop due to the identified one or more idle blocks. As will be discussed further below within the context of an exemplary multi-core processor IC, the reduced amount may be determined in any suitable manner. For example, a $\Delta V_R$ value could be acquired by looking it up in a memory structure based on operating conditions and number/type of idle blocks. Alternatively, it could be derived from interpolation of boundary values (e.g., fused into the IC) such as $\Delta V_R$ values or $\Delta I_C$ values based on operating conditions and number/type of idle blocks. For example, a $\Delta V_R$ could be calculated a $\Delta V$ based on an estimation of $\Delta I_C$ (in view of the idle blocks) and a known value for $R_{LL}$. Various other approaches may be used and are within the scope of the invention.

Figure 3:
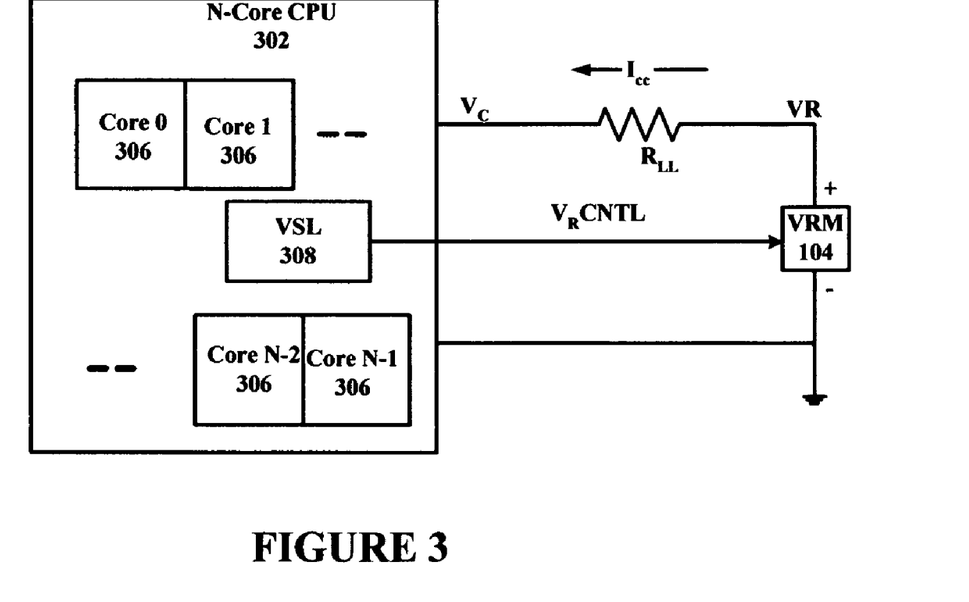
FIG. 3 is a diagram of a multi-core processor with a VSL according to some embodiments of the invention.

FIG. 3 is a block diagram of a multi-core processor 302 with a VSL to request a reduced $V_R$, based on one or more of its cores being idle, in accordance with some embodiments. Processor 302 has N cores 306 (core 0 to core N−1) and a VSL 308 to determine a supply voltage $V_R$ to be requested from a VRM 104. In this example, the n cores are on the same power plane but have independent clock distributions. Furthermore, the cores are assumed to be copies of each other and have similar power characteristics.

Processor 302 may operate in different performance states, as determined by applications being processed. The term "performance state" generally refers to an operating level specification for a processor or cores within a processor. For example, a common performance state specification, the Advanced Configuration and Power Interface (ACPI) specification defines different P-states to dictate operating core voltage and frequency for the different performance states within the specification. With this specification, P0 is the highest performance state, while Pn is the lowest performance state.

With some platforms, when starting up, the computing platform basic input/output system (BIOS) builds a P-state data structure, to provide P-state information to the processor, based on data obtained from the processor (for example, from programmed, e.g., fused boundary values). For each performance state, the data structure provides the specified operating supply voltage and frequency. In some embodiments, different p-states can be requested (e.g., from different operating system threads) for each core's process, but control logic will choose the most active state and apply it to each core. At the same time, however, this does not necessarily mean that every core will be running at the specified p-state parameters. there also may be so-called underlying C-states which may be separately applied to the various cores. So while a relatively active p-state (e.g., P0 or P1) may be assigned for the overall processor 302, as designated by their C-states, some cores may actually be idle (e.g., have turned off or substantially reduced clocks).

The chip supply current ($I_c$) has a dynamic component ($I_{CDy}$) and a static component ($I_{CS}$) such that: $I_C=I_{CDy}+I_{CS}$. The dynamic component ($I_{CDy}$) represents the switching current, while the static component ($I_{CS}$) represents the leakage current. A core typically consumes static (leakage) current, regardless of whether or not the core is active or idle, but its dynamic current depends on its clock. If a core's clock is turned off or substantially reduced, then it can reasonably be assumed that: $I_{CDy}=0$. In some embodiments, it can also reasonably be assumed that the cores 306 have the same (or sufficiently similar) power characteristics, i.e., dynamic current consumption for a given performance state. This fact can be used to determine how much the dynamic component ($I_{CDy}$) of the overall supply current ($I_C$) will drop for a given P-state based on the number of cores that are idle.

For a given P-state, a dynamic current per-core value ($I_{CDyi}$) can be multiplied by the number of idle cores, i, to obtain the overall reduction in dynamic current ($\Delta I_{CDy}$) and thus, the overall reduction in supply current ($I_C$). (The reduction is relative to a pre-assumed value used to define the $V_R$ value to meet the $V_C$ requirement.) From this, the amount $\Delta V$ that the requested VR can be lowered is: $\Delta I_{CDy} \times R_{LL}$. This $\Delta V_R$ can be reduced from a higher $V_R$ that otherwise would have been used to meet the specified requirements.

(In exemplary embodiments discussed herein, it is generally assumed that each core consumes the same amount of dynamic current for a given performance state when active. This allows one to estimate the overall current reduction by multiplying the number of idle cores by a per-core current value for a given P-state (performance state). It should be recognized, however, that this assumption is not necessary. For example, separate per-core current values for different types or classes of cores or for each core could be used, and the separate currents could be added to arrive at an overall supply current reduction.)

Figure 4:
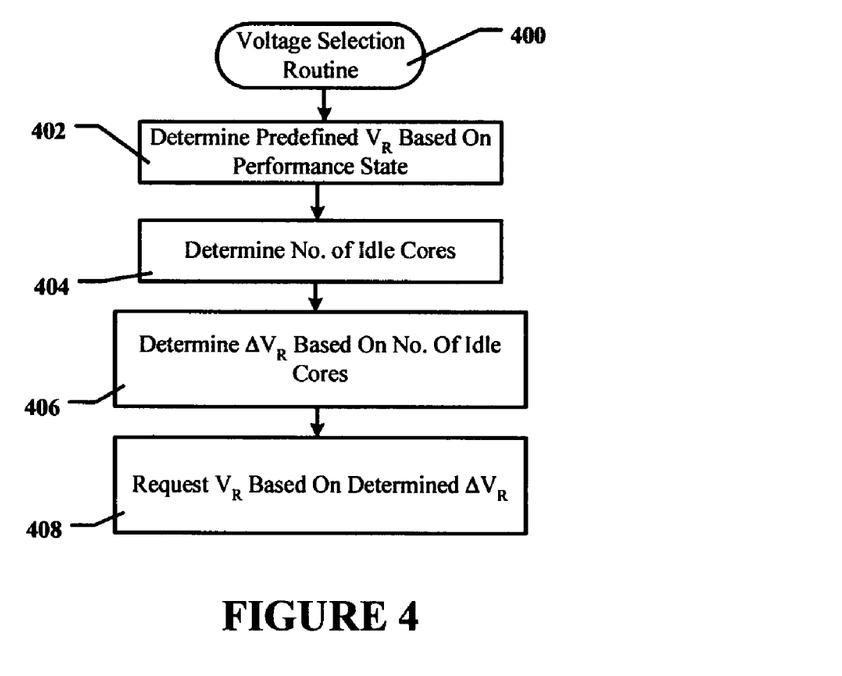
FIG. 4 is a flow diagram of a voltage selection routine for the processor of FIG. 3 according to some embodiments of the invention.

FIG. 4 shows a routine 400 for selecting a requested voltage $V_R$ from VRM 104. Routine 400 may be performed by the VSL 308. At 402, it determines a predefined $V_R$ based on a specified performance state. For example, it could obtain this value from a P-state data structure, either within the processor 302 or off-chip, e.g., in memory used for the BIOS or operating system. It could even be programmed (e.g., fused) into the processor chip itself. At 404, the number of idle cores 306 are determined. (Note that routine actions 402 and 404, as with any routine actions described herein, may be performed in any order unless expressly indicated to the contrary, or otherwise dictated by the nature of the actions.)

At 406, a reduction $\Delta V_R$ in the drop across the load-line resistance is determined. This may be done in various different ways, depending on a processor configuration and particular design concerns. More on this will be discussed below. At 408, a VR based on the determined $\Delta V_R$ is provided to the VRM.

Figure 5:
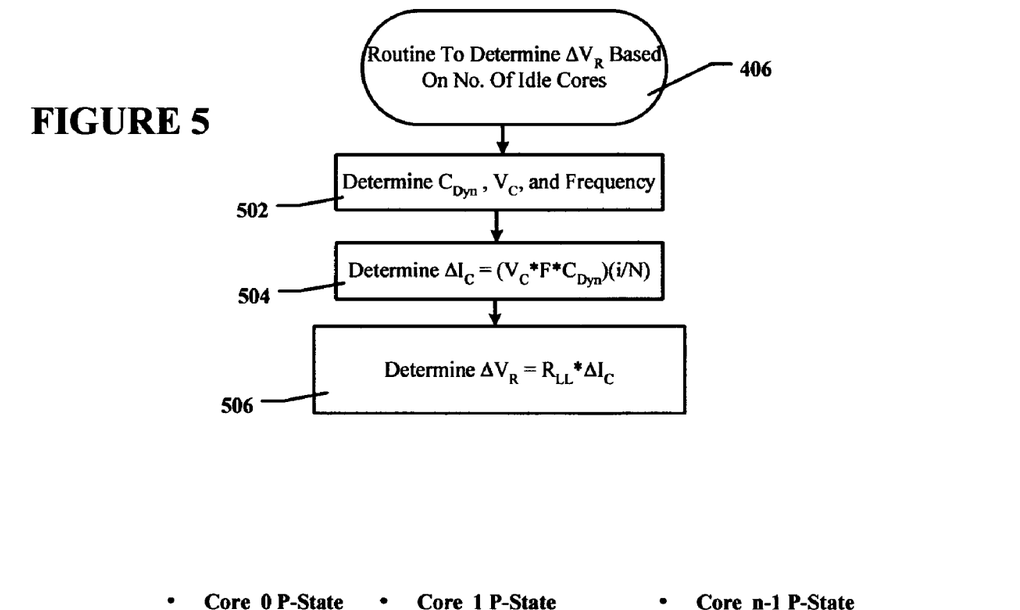
FIG. 5 is a flow diagram of a routine to determine load line drop reduction according to some embodiments of the invention.

FIG. 5 shows a routine 406 to determine $\Delta V_R$ based on a number of idle cores, i, in accordance with some embodiments. At 502, it determines the total dynamic capacitance for the chip ($C_{Dyn}$), frequency F, and supply voltage $V_C$ for the applicable performance state. At 504, it determines the amount of reduced supply current ($\Delta I_C$) using the formula: $\Delta I_C=(C_{Dyn} \cdot F \cdot V_C)(i/N)$, where i is the number of idle cores, and N is the total number of cores. F and $V_C$ will typically be defined in the performance state specification, and $C_{Dyn}$ (for the processor chip) may be provided by the chip manufacturer or determined through parameter characterization. It could be programmed into the chip during manufacturing, or it could be made available from an external memory source.

At 506, a value for $\Delta V_R$ is determined by multiplying the determined $\Delta I_C$ by $R_{LL}$. As with the other parameters, RLL too could be programmed into the chip (burned, loaded as machine code), or it could be made available to it from an external memory source.

It should be appreciated that $\Delta V_R$ could be determined in various other ways and is not limited to the routine of FIG. 5. For example, a suitable $\Delta V_R$ value could be retrieved (looked up) based on the P-state and number of idle cores. This might consume a relatively large amount of memory but could be feasible depending on design concerns and how it is implemented. For example, max. and min. $\Delta V_R$ values could be burned or fused in a processor chip, and a data structure containing the different values could be generated and stored in memory, similar to how the BIOS generates P-state data in some embodiments. Alternatively, for greater flexibility, $\Delta I_C$ values (instead of $\Delta V_R$) values could be programmed into or generated for a table to be retrieved based on particular operating parameters (e.g., P-state) and the number of idle cores. In this way, a $\Delta V_R$ value could be determined for any VRM and power delivery network. The value for RLL for a given implementation could then be provided to the VSL 308 from a source, e.g., at start-up. For example, it could be stored in a BIOS register or even burned into firmware at the factory for a particular power network delivery configuration. As will be appreciated, numerous other methods may be implemented and are within the scope of the claims.

Figure 6:
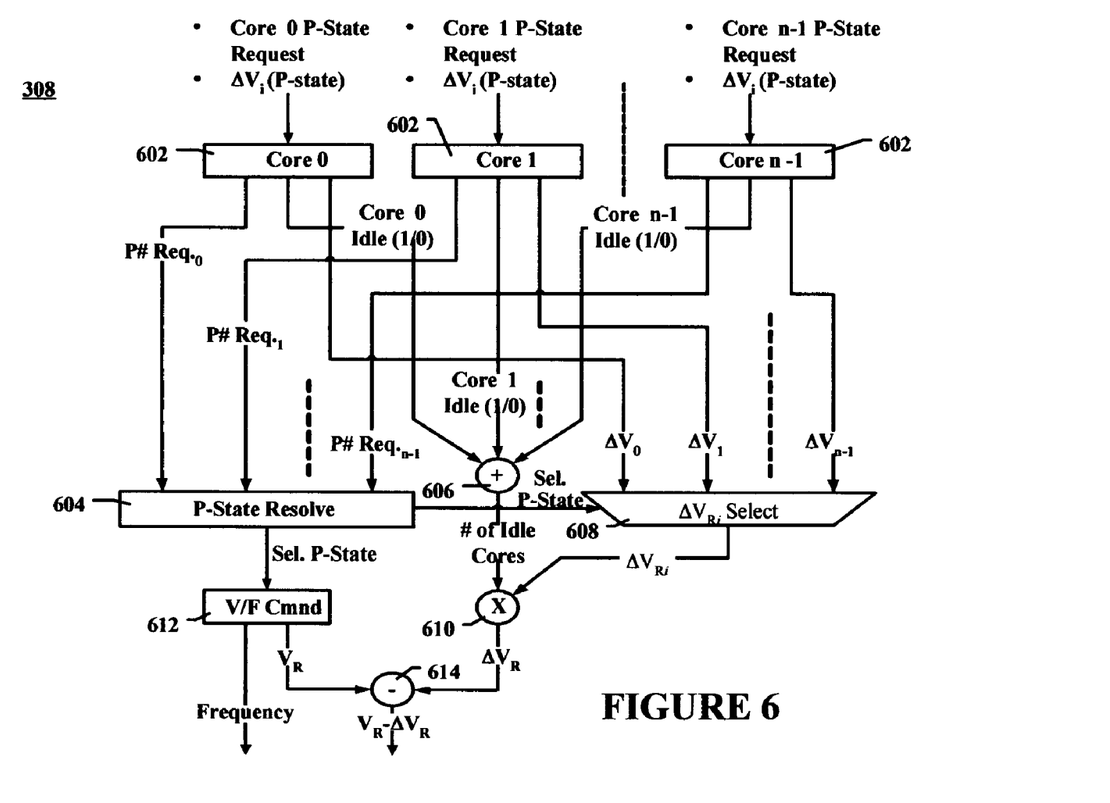
FIG. 6 is a block diagram of a Voltage selection logic according to some embodiments of the invention.

FIG. 6 is a block diagram for a voltage selection logic (VSL) 308 in accordance with some embodiments. It generally comprises parameter registers 602 for the various cores (core 0 to core n–1), P-state resolve logic 604, adder logic 606, multiplexer 608, multiplier logic 610, V/F command register 612, and subtraction logic 614, all coupled together as shown. (Note that in this embodiment, voltage reduction logic is incorporated into legacy voltage/frequency logic, tapping into the VR output from the V/F Command register 612 to provide the reduced $V_R$ ($V_R-\Delta V_R$) request. This is not required though. numerous different ways to modify an existing design or create a new and/or separate VSL may be employed. Along these lines, the VSL blocks may be implemented with any combination of circuit elements, logic, and/or machine code as may be desired for a particular design.)

The parameter registers 602 each receive a P-state identifier for its associated core, along with a $\Delta V_{Ri}$ (per idle-core) value for the requested P-state. The parameter registers 602 provide their P-states to the P-state resolve logic 604, which processes the P-state requests for the cores and selects a P-state to be applied to all of the cores. For example, in some embodiments, it selects the most active requested P-state from the requested P-states. In addition, the parameter registers 602 provide to adder logic 606 a digital value indicating whether or not their associated core is idle. The adder logic 606 combines (sums) these values to produce a result to the multiplier logic 610 indicating how many cores are idle. Finally, the parameter registers 602 provide to multiplexer 608 $\Delta V_{Ri}$ information for their requested P-state. The selected P-state signal from P-state resolve logic 604 selects the voltage reduction factor ($\Delta V_{Ri}$) associated with the selected P-state. This value is provided to multiplier 610 and multiplied by the number of idle cores to obtain a net voltage reduction value ($\Delta V_R$). This product is then subtracted from the VR value provided from the V/F command register 612 and provided to the VRM 104. For example, it may be provided to one or more voltage select pins or to an off-chip interface to be communicated to the VRM.

Figure 7:
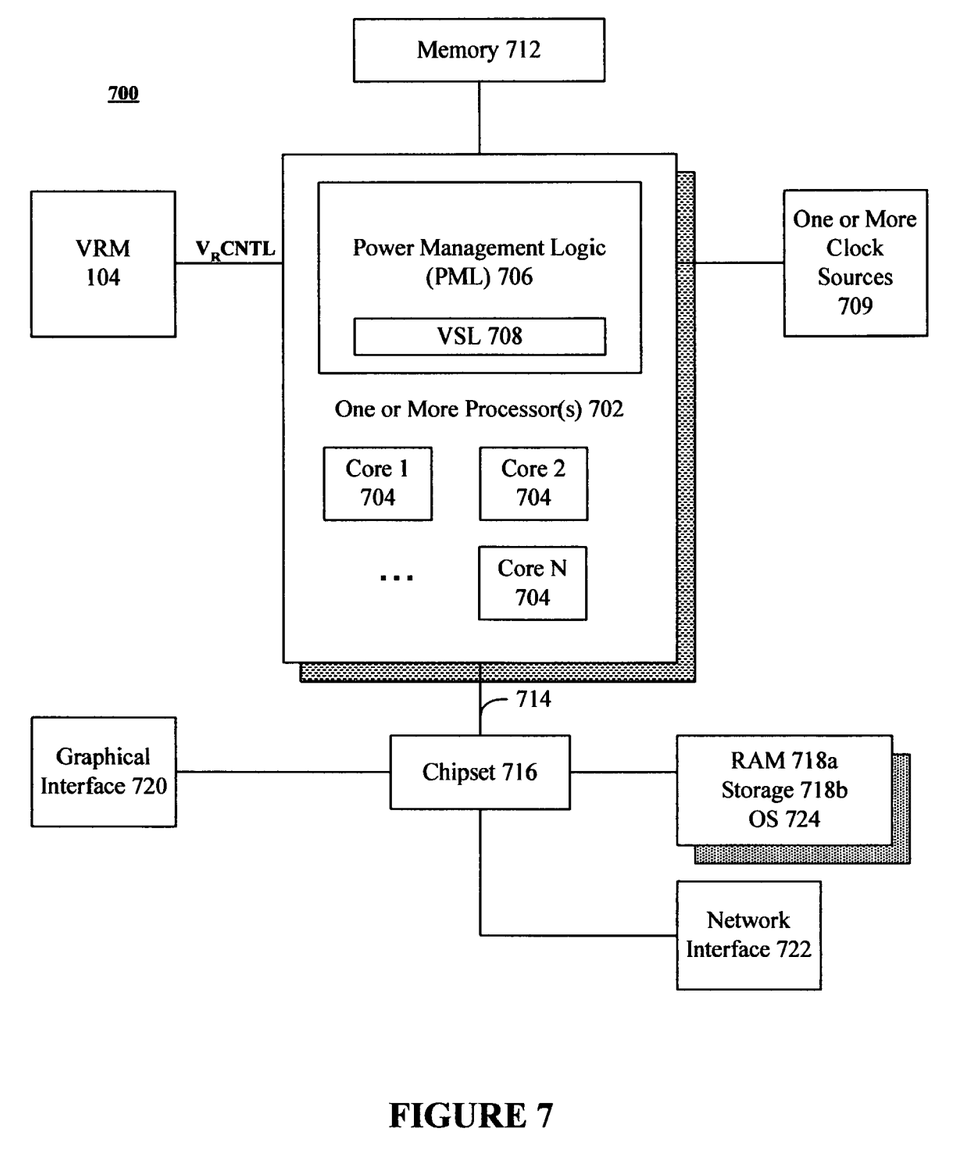
FIG. 7 is a system-level block diagram of an example computer system according to some embodiments of the invention.

FIG. 7 is a block diagram of a computer system 700 having voltage selection logic (VSL) 708 to provide a dynamically reducible $V_R$ request to the VRM when supply current decreases, in accordance with some embodiments of the invention. The computer system 700 may be a personal computer system or corporate computer system such as, for example, a laptop, notebook or desktop computer system. The computer system 700 may include one or more processors 702, which may include sub-blocks such as, but not limited to, one or more cores, illustrated by cores 704 (core 1 to core N), and power management logic (PML) 706, which may include VSL 708, which in some embodiments may be implemented as a module which includes equivalent logic, as one of ordinary skill in the relevant art would appreciate based at least on the teachings described herein.

The one or more processor(s) 702 may be an Intel® Architecture microprocessor. For other embodiments, the processor(s) may be a different type of processor such as, for example, a graphics processor, a digital signal processor, an embedded processor, etc. and/or may implement a different architecture.

The one or more processors 702 may be operated with one or more clock sources 709 and provided with power from one or more voltage regulator modules (VRMs) 104. The one or more processors 702 may also communicate with other levels of memory, such as memory 712. Higher memory hierarchy levels such as system memory (RAM) 718a and storage 718b, such as a mass storage device which may be included within the system or accessible by the system, may be accessed via host bus 714 and a chip set 716.

In addition, other functional units such as a graphics interface 720 and a network interface 722, to name just a few, may communicate with the one or more processors 702 via appropriate busses or ports. Other devices such as an antenna (not shown) could be coupled to the network interface to couple the one or more processors to a wireless network.

Furthermore, one of ordinary skill would recognize that some or all of the components shown may be implemented using a different partitioning and/or integration approach, in variation to what is shown in FIG. 7, without departing from the spirit or scope of the embodiment as described.

For some embodiments of the invention, the storage 718b may store software such as, for example an operating system 724. For one embodiment, the operating system is a Windows® operating system, available from Microsoft Corporation of Redmond, Wash., that includes features and functionality according to the Advanced Configuration and Power Interface (ACPI) Standard and/or that provides for Operating System-directed Power Management (OSPM). For some embodiments, the operating system may be a different type of operating system such as, for example, a Linux operating system.

While the system 700 may be a personal computing system, other types of systems such as, for example, other types of computers (e.g., handhelds, servers, tablets, web appliances, routers, etc.), wireless communications devices (e.g., cellular phones, cordless phones, pagers, personal digital assistants, etc.), computer-related peripherals (e.g., printers, scanners, monitors, etc.), entertainment devices (e.g., televisions, radios, stereos, tape and compact disc players, video cassette recorders, camcorders, digital cameras, MP3 (Motion Picture Experts Group, Audio Layer 3) players, video games, watches, etc.), and the like are also within the scope of various embodiments. The memory circuits represented by the various foregoing figures may also be of any type and may be implemented in any of the above-described systems.

The VSL 708 may operate in cooperation with other features and functions of the processor(s) 701 such as the power management module 706. In particular, the power management module of one embodiment may control power management of the processor(s) 701 and/or of the individual core(s) 704, including transitions between various power states. Where the operating system 724 supports ACPI, for example, the VSL 708 may control and track the c-states of the various core(s) and/or the p-states. The power management logic 706 may also store or otherwise have access to other information to be used in managing the dynamic requested VRM voltage of one or more embodiments such as, for example, the amount of active memory and/or one or more cores, a minimum cache memory size, timer information, and/or other information stored in registers or other data stores.

Furthermore, as one of ordinary skill in the relevant arts would appreciate the VSL 708 may use additional intermediate states, as well as larger and/or smaller states, for some embodiments of the invention.

While many specifics of one or more embodiments have been described above, it will be appreciated that other approaches for dynamically reducing requested supply voltage may be implemented for other embodiments. For example, while specific power states are mentioned above, for other embodiments, other power states and/or other factors may be considered in determining that an effective requested supply voltage is to be increased or decreased.

Further, while a dynamic supply based on idle cores is discussed for chips with a single supplied voltage (e.g., from a VRM) for purposes of example, it will be appreciated that a requested supply voltage approach according to one or more embodiments may be applied to a different type of power delivery and/or host integrated circuit chip and/or system.

Figure 8:
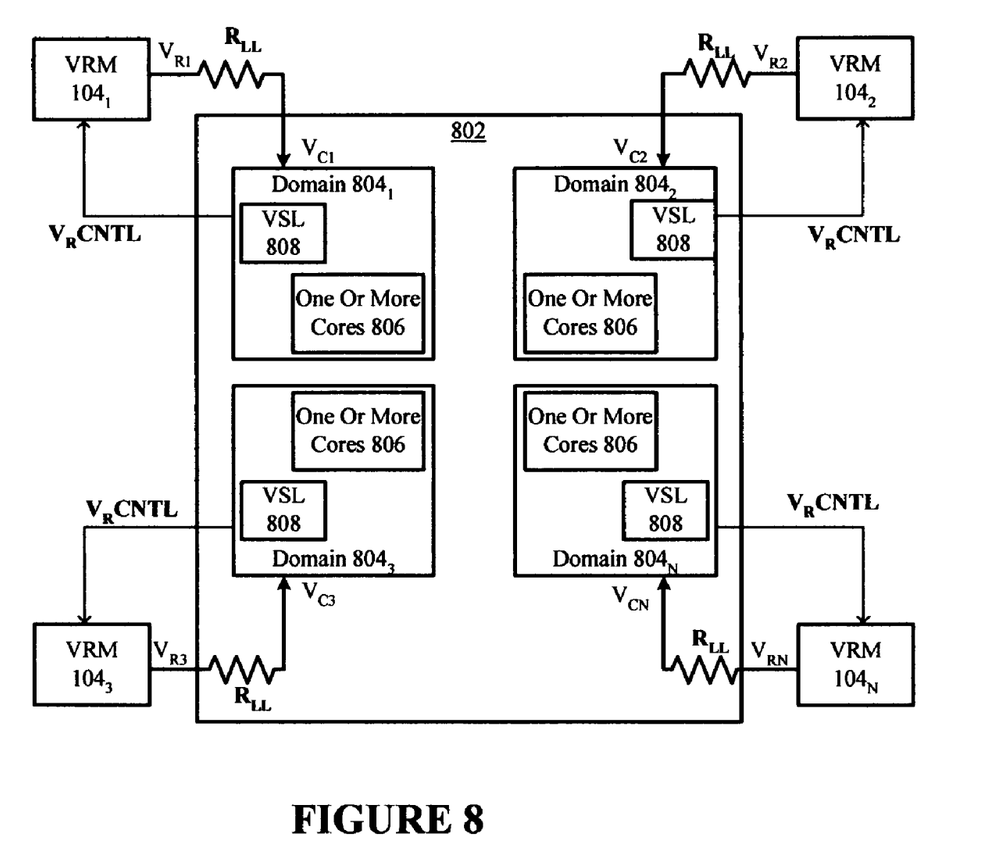
FIG. 8 is a diagram of a multi-core processor with multiple supply voltage domains according to some embodiments of the invention.

For example, a processor with multiple cores in multiple supply domains, such as is shown in FIG. 8, could employ supply reduction as taught herein. Processor 802 comprises N different supply domains $804_i$, each coupled to an associated VRM $104_i$ to provide its domain with a separately controllable supply $V_C$ in response to a requested $V_R$. Each domain comprises one or more cores $806_i$ and a VSL $808_i$ to request a supply $V_{Ri}$ based on a number of idle cores within its domain.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments. Alternative embodiments of the invention also include machine-accessible media containing instructions for performing the operations of the invention. Such embodiments may also be referred to as program products. Such machine-accessible media may include, without limitation, storage media such as floppy disks, hard disks, CD-ROMs, ROM, and RAM, and other tangible arrangements of particles or molecules manufactured or formed, or otherwise detectable by, a machine or device. Instructions may also be used in a distributed environment, and may be stored locally and/or remotely for access by single or multi-processor machines.

Furthermore, for ease of understanding, certain method procedures may have been delineated as separate procedures; however, these separately delineated procedures should not be construed as necessarily order dependent in their performance. That is, some procedures may be able to be performed in an alternative ordering or simultaneously, as one of ordinary skill would appreciate based at least on the teachings provided herein.

Embodiments of the present invention may be described in sufficient detail to enable those skilled in the art to practice the invention. Other embodiments may be utilized, and structural, logical, and intellectual changes may be made without departing from the scope of the present invention. Moreover, it is to be understood that various embodiments of the invention, although different, are not necessarily mutually exclusive. For example, a particular feature, structure, or characteristic described in one embodiment may be included within other embodiments. Accordingly, the detailed description is not to be taken in a limiting sense.

The foregoing embodiments and advantages are merely exemplary and are not to be construed as limiting the present invention. For instance, the present teaching can be readily applied to other types of memories. Those skilled in the art can appreciate from the foregoing description that the techniques of the embodiments of the invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. An integrated circuit apparatus comprising:
    one or more functional blocks or cores in a multi-core processor that may be idle when the apparatus is operating; and
    logic to determine a supply voltage level to be requested from a VRM based on a number of the one or more functional blocks or cores that are idle, a supply current reduction based on a per-core dynamic current value and the number of idle functional blocks or cores, and a load-line resistance value.

2. The apparatus of claim 1, in which the one or more functional blocks are cores in a processor.

3. The apparatus of claim 2, in which the predefined level is based on a performance state for the processor.

4. The apparatus of claim 3, wherein the predefined level is reduced by an amount determined from looking up a current per-core parameter for the performance state.

5. The apparatus of claim 3, wherein the predefined level is reduced by an amount based on determining reduced supply current as a function of IC dynamic capacitance.

6. The apparatus of claim 3, wherein the predefined level is reduced by an amount determined from looking up a $\Delta V$ per-core parameter for the performance state.

7. The apparatus of claim 1, in which the functional blocks consume substantially the same dynamic current when they are not idle and at the same performance state.

8. The apparatus of claim 1, in which the logic and one or more functional blocks are part of a supply domain, which is one of a plurality of supply domains within the apparatus.

9. A method, comprising:
    determining a pre-specified supply voltage to be requested from a VRM;
    determining how many cores in a multi-core processor or functional blocks in an operating integrated circuit are idle;
    determining a per-core dynamic current value and multiplying the value by the number of idle cores to determine a supply current reduction;
    determining how much to reduce the supply voltage based on the reduced supply current and a load-line resistance value; and
    reducing the pre-specified supply voltage by an amount determined based on the reduced supply current and load-line resistance value.

10. The method of claim 9, further comprising providing the reduced supply voltage to the VRM.

11. The method of claim 9, in which the functional blocks are cores in a multi-core processor.

12. The method of claim 9, comprising determining a per-core $\Delta V_R$ value and multiplying the value by the number of idle cores to determine how much to reduce the pre-specified supply voltage.

13. The method of claim 9, in which the load-line resistance value is fused into the integrated circuit.

14. The method of claim 13, in which the load-line resistance value is retrieved from outside of the integrated circuit.

15. A processor, comprising:
    a plurality of cores to be operable at a selected one of a number of performance states; and
    voltage selection logic to request a supply voltage $V_R$ to provide the cores with a received supply voltage $V_C$, wherein $V_R$ is reduced by an amount determined based on a number of the cores that are idle when the processor is operating, a supply current reduction based on a per-core dynamic current value and the number of idle cores, and a load-line resistance value.

16. The processor of claim 15, in which $V_R$ is to be determined from reducing a pre-specified $V_R$, based on the selected performance state, by an amount derived from determining a supply current reduction.

17. The processor of claim 16, in which the reduction in supply current is determined by retrieving a per-core supply current value from a performance state data structure.

18. The processor of claim 15, in which $V_R$ is to be determined from reducing a pre-specified $V_R$, based on the selected performance state, by an amount derived from determining a per-core voltage value.

19. The processor of claim 18, in which the per-core voltage value is to be retrieved from a performance state data structure.

20. The processor of claim 15, in which $V_R$ is to be requested from a VRM.

21. The processor of claim 20, comprising at least part of the VRM.

22. The processor of claim 20, in which the plurality of cores and voltage selection logic are part of a supply domain that is one of a multiplicity of supply domains of the processor.

23. A computer system, comprising:
a processor having:
a plurality of cores to be operable at a selected one of a number of performance states, and
voltage selection logic to request a supply voltage $V_R$ to provide the cores with a received supply voltage $V_C$, wherein $V_R$ is reduced by an amount determined based on a number of the cores that are idle when the processor is operating, a supply current reduction based on a per-core dynamic current value and the number of idle functional blocks or cores, and a load-line resistance value.;
at least part of a voltage regulator to generate the $V_R$ supply to provide $V_C$ to the processor; and
an antenna to be coupled to the processor to communicatively link it with a wireless network.

24. The computer system of claim 23, in which $V_R$ is to be determined from reducing a pre-specified $V_R$, based on the selected performance state, by an amount derived from determining a supply current reduction.

25. The computer system of claim 24, in which the reduction in supply current is determined by retrieving a per-core supply current value from a performance state data structure.

26. The computer system of claim 23, in which $V_R$ is to be determined from reducing a pre-specified $V_R$, based on the selected performance state, by an amount derived from determining a per-core voltage value.

27. The computer system of claim 26, in which the per-core voltage value is to be retrieved from a performance state data structure.

* * * * *